United States Patent [19]
Takeuchi

[11] 3,920,293
[45] Nov. 18, 1975

[54] BEARING MADE OF PLASTICS

[76] Inventor: Hirokazu Takeuchi, 15, 1-Chome, Toyosakinishidori, Oyodo, Osaka, Japan

[22] Filed: Apr. 30, 1974

[21] Appl. No.: 465,669

[52] U.S. Cl. ............... 308/191; 308/177; 308/238; 308/DIG. 8
[51] Int. Cl.² ......................................... F16C 33/20
[58] Field of Search . 308/191, 190, DIG. 7, DIG. 8, 308/DIG. 11, 238, 173, 177, 36, 37, 237 R, 237 A

[56] References Cited
UNITED STATES PATENTS

| | | | |
|---|---|---|---|
| 2,995,405 | 8/1961 | Ferdig | 308/190 |
| 3,089,221 | 5/1963 | Barr | 308/DIG. 7 |
| 3,194,615 | 7/1965 | Weasler | 308/238 X |
| 3,429,627 | 2/1969 | Freund | 308/238 |
| 3,469,892 | 9/1969 | Langstroth | 308/191 X |

FOREIGN PATENTS OR APPLICATIONS

| | | | |
|---|---|---|---|
| 665,254 | 6/1963 | Canada | 308/190 |
| 1,913,365 | 9/1970 | Germany | 308/DIG. 7 |

*Primary Examiner*—M. Henson Wood, Jr.
*Assistant Examiner*—Randolph A. Reese
*Attorney, Agent, or Firm*—Wenderoth, Lind & Ponack

[57] ABSTRACT

A bearing made up of an inner ring to be mounted on a shaft, a casing serving as an outer ring and surrounding the inner ring concentrically therewith, an annular intermediate element idly rotatably accommodated in an annular space between the inner ring and the casing, and a retainer ring fitted in one open side of the casing to retain the annular intermediate element in position. The annular intermediate element includes several members of circular section equidistantly spaced apart in a circular arrangement and connector plates interconnecting the members in the form of a ring. The intermediate element is slidingly rotatable in point or line contact with the outer peripheral surface of the inner ring and the inner peripheral surface of the casing.

7 Claims, 11 Drawing Figures

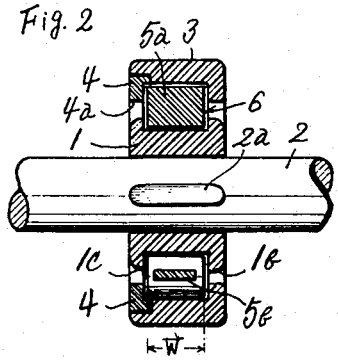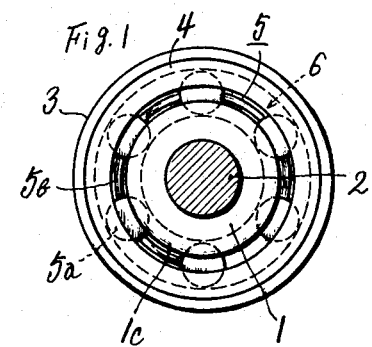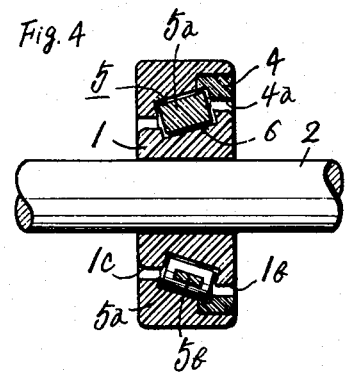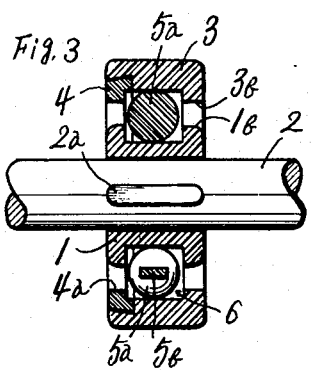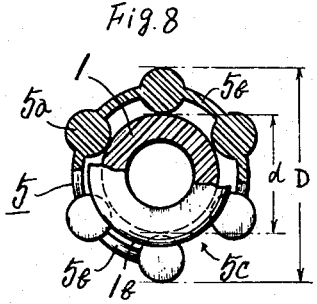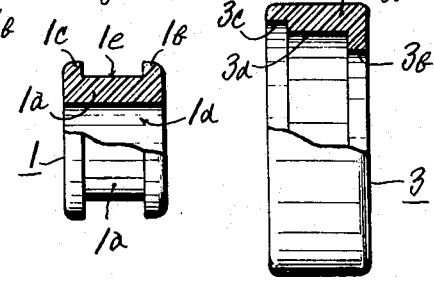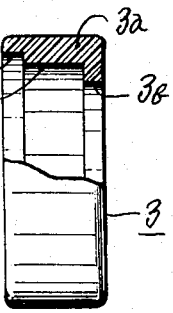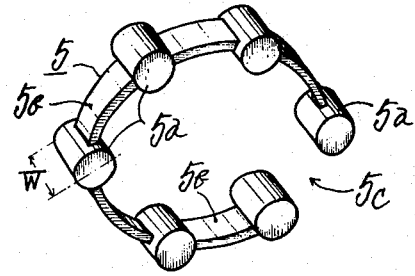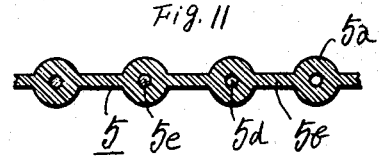

BEARING MADE OF PLASTICS

BACKGROUND OF THE INVENTION

The present invention relates to a bearing made of plastic and including an intermediate element which does not roll along in rolling contact with the ring surfaces unlike ball bearings but which slidingly rotates in line contact or point contact therewith.

Generally known bearings are so-called ball or roller bearings comprising inner and outer rings and a plurality of steel balls or rollers interposed between the two rings and journal bearings of the fixed type which are in the form of a hollow cylinder made of metal such as gun metal or of a material such as synthetic resin having lubricating properties. The ball or roller bearing has a mechanically outstanding advantage in that the balls or rollers roll along to effectively mitigate the frictional resistance on a rotary shaft, whereas it has the disadvantages of needing lubrication and being costly since the high degree of sphericity or roundness essential to the balls or rollers necessitates excellent manufacturing technique and equipment. With bearings of this type, furthermore, a failure of lubrication has the result that the rolling elements no longer roll smoothly, eventually producing an uneven wear on the rolling elements and making them incapable of rolling. When used in a humid environment, they are subject to rusting and become incapable of rolling.

The journal bearing which is simply in the form of a cylinder fitted around and supporting a rotary shaft is simple in construction and inexpensive, but it functions on a surface contact over the entire area of its bearing surface and is therefore unfit for use, unlike ball bearings, in a mechanism wherein high speed rotation and precision is critical. Thus the journal bearing has inherently limited applications and is employed solely as a simple bearing.

SUMMARY OF THE INVENTION

An object of this invention is to provide a simple and inexpensive plastic bearing including an intermediate element made by plastic molding as an integral ring of special shape unlike the conventionally used balls or rollers which are rollable individually independently, the intermediate ring element being accommodated in an annular space between an inner ring and an outer ring and slidable in line or point contact with the rings, following the rotation of one of the rings.

Another object of this invention is to provide a bearing in which the annular intermediate element is made of plastic so as to compensate for the dimensional errors by the elasticity inherent in the plastic material itself and which is useful for a prolonged period of time without lubrication.

Another object of this invention is to provide an excellent bearing components of which are easy to make and which is simple to assemble and disassemble and free of rusting even when used in a humid environment or in water.

The bearing of this invention comprises an inner ring adapted to be mounted on a stationary or rotary shaft, a casing serving as an outer ring and surrounding the inner ring concentrically therewith, an annular intermediate element disposed in an annular space between the inner and outer rings and slidable in point or line contact with the outer and inner peripheral surfaces of the inner and outer rings, and a retainer ring.

The above and other objects and advantages of this invention will be fully understood from the description of the preferred embodiments of the invention given below for illustrative purposes with reference to the accompanying drawings.

BRIEF DESCRIPTION OF THE DRAWINGS

FIG. 1 is a front view showing a bearing of this invention;

FIG. 2 is a side elevation of the same in vertical section;

FIG. 3 is a side elevation in vertical section showing a second embodiment of this invention;

FIG. 4 is a side elevation in vertical section showing a thrust bearing as a third embodiment of this invention;

FIG. 5 is a side elevation showing a casing serving as the outer ring of the bearing, the upper half of the casing being shown in section;

FIG. 6 is a side elevation of an inner ring the upper half portion of which is similarly shown in section;

FIG. 7 is a side elevation of a retainer ring, the upper half portion of which is likewise shown in section;

FIG. 8 is a front view illustrating an annular intermediate element as fitted around the inner ring, the upper half of the assembly being shown in section;

FIG. 9 is a perspective view of the annular intermediate element;

FIG. 10 is a developed view of the intermediate element in vertical section; and FIG. 11 is a similar view in vertical section showing another example of the intermediate element.

DESCRIPTION OF THE PREFERRED EMBODIMENTS

With reference to FIGS. 1, 2, and 5–9, an inner ring 1 mounted on a stationary or rotary shaft 2 includes a hollow cylindrical portion 1a and flanges 1b and 1c formed at the opposite ends of the cylindrical portion 1 integrally therewith. The cylindrical portion 1a has a hollow portion 1d in which the shaft 2 is fitted to support the shaft. The inner ring 1 may be secured to the shaft 2 with a key 2a or some other suitable means when so desired. A casing 3 serving as an outer ring comprises a cylindrical portion 3a having an inner diameter larger than the outer diameter of cylindrical portion 1a of the inner ring 1 and a flange 3b inwardly projecting from one end of the cylindrical portion 3a and formed integrally therewith. The cylindrical portion 3a has, at the other end thereof, a stepped portion 3c for a retaining ring 4 which fits therein Formed integrally on the retaining ring 4 is an inwardly projecting flange 4a positioned in opposing relation to the flange 3b when the retaining ring 4 is fitted in the casing 3.

Each of the inner ring 1, casing 3 and retainer ring 4 is integrally molded of polyacetal resin, polyamide resin or like rigid synthetic resin or of a material prepared by adding to such resin fluorine-containing resin which gives improved lubrication. However, if the place of use and conditions permit, some other suitable material such as metal or oil-containing porous metal is also usable.

As seen in FIG. 9, an annular intermediate element 5 comprises several small members 5a of circular section having the same size and the same shape and equidistantly spaced apart in a circular arrangement and connector plates 5b interconnecting the members 5a in the form of an integral ring. When the members 5a of circular section are cylindrical, the diametrically opposing outer peripheral portions of the members 5a are connected by the connector plates 5b so that the axes of the members 5a are positioned parallel to the shaft 2. If one of the connector plates 5b is removed from the annular intermediate element 5, an intermediate element of the split ring type is obtained which is conveniently mountable or removable and functions with good results, since the annular shape is diametrically changeable. FIGS. 8 and 9 show an annular intermediate member of the split type in which the ring is partly cut away as at 5c The annular intermediate element 5, including the members 5a and connector plates 5b constituting an integral body, is molded of polyacetal resin, polyamide resin or like rigid synthetic resin or of a material prepared by adding to such resin fluorine-containing resin which gives improved lubrication. The annular intermediate element 5 is accommodated in an annular space 6 between the inner ring 1 and the casing 3 serving as the outer ring. Accordingly, the intermediate element 5 has an outer diameter D which is equal to or slightly smaller than the inner diameter of the cylindrical portion 3a of the casing 3 and an inner diameter d which is equal to or slightly larger than the outer diameter of the cylindrical portion 1a of the inner ring 1. The annular element 5 has a width W such that it fits in between the opposite flanges 1b and 1c of the inner ring 1 somewhat loosely.

The bearing of this invention will be assembled in the following manner. First, the annular intermediate element 5 is fitted around the cylindrical portion 1a of the inner ring 1. Inasmuch as the cutout 5c permits the annular element 5 to be forced diametrically outward, the annular element 5 can be easily fitted in place in spite of the provision of the flanges 1b and 1c. With the annular intermediate element 5 thus fitted around the inner ring 1, the members 5a of circular section which are interconnected by the connector plates 5b are positioned between the opposing flanges 1b and 1c, in contact with the outer peripheral surface 1e of the cylindrical portion 1a, and are free to revolve around the cylindrical portion 1a as shown in FIG. 8. Next, the inner ring 1 with the intermediate element 5 mounted thereon is placed into the casing 3 from its open side. The retainer ring 4 is then forced into the stepped portion 3c in the open end of the casing 3. Consequently, the flange 3b engages one end of the intermediate element 5 at one side of the casing 3, while the flange 4a of the retainer ring 4 engages the other end of the element 5 at the other side of the casing 3, whereby the element 5 is retained in position against idle movement in the axial direction. Thus the parts are completely assembled.

To disassemble the bearing, the retainer ring 4 is first removed to thereby remove one of the flanges from the casing 3. The intermediate element 5 is then taken out of the casing from that side.

When the annular intermediate element 5 is disposed between the inner ring 1 and the casing 3 in the manner described above, the members 5a interconnected by the connector plates 5b are in line contact with the inner peripheral surface 3d of the casing 3 and the outer peripheral surface 1e of the inner ring 1. Suppose the casing 3, for example, rotates around the inner ring 1 keyed to the shaft 2. As the casing 3 rotates, the annular intermediate element 5 also rotates slidingly with the peripheral surface of members 5a in line contact with the ring and the casing, following the rotation of the casing 3 in the same direction. If the inner ring 1 rotates with the shaft 2, the annular intermediate element 5 slidingly rotates to follow the rotation of the inner ring 1. In either case, therefore, the rotation takes place with great ease and smoothness.

FIG. 3 shows members 5a', interconnected by the connector plates 5b, which are spherical and therefore function in point contact. Although not shown, the above-mentioned members may alternatively be ellipsoidal.

Illustrated in FIG. 4 is a thrust bearing embodying the present invention, in which the outer periphery of cylindrical portion 1a of the inner ring 1 is tapered in the form of a cone and the inner periphery 3d of the cylindrical portion of the casing 3 is similarly tapered to accommodate a conical annular intermediate element therebetween.

Although the retainer ring 4 is fitted in the right side of the casing in the illustrated embodiment, it may alternatively be fitted in the left side.

FIG. 11 shows another example of the intermediate element 5 in which each cylindrical member 5a has a center hole 5d to impart a cushioning property to the element 5. Alternatively, a reinforcing material 5e may be inserted into the hole 5d to give improved strength to the element 5.

The outer periphery 4b of the retainer ring 4 and the inner periphery of the stepped portion 3c of the casing 3 may be tapered in the shape of a cone to provide them with an inwardly increasing diameter. If the retainer ring 4 is then forcibly fitted into the stepped portion 3c, the retainer ring 4 will be held in position more firmly as in a snap fastener. Furthermore where there is no need to disassemble the bearing, the retainer ring 4 may be welded to the casing 3 when fitted therein, whereby the retainer ring 4 is made unremovable.

Although embodiments of this invention are described above with reference to the drawings, it is to be understood that various modifications can be made to the construction and that the invention is not limited to the embodiments given. Furthermore, the features of the embodiments are interchangeable insofar as they are not contradictory.

What I claim is:

1. A bearing comprising an inner ring adapted to be mounted on a shaft, an annular outer ring surrounding said inner ring concentrically therewith, said rings having opposed parallel surfaces spaced from each other, a plastic annular intermediate element idly rotatably accommodated between said annular surfaces and slidingly rotatable to follow the rotation of one of said rings, and a retainer ring fitted in one open side of the outer ring to retain the annular intermediate element in position, the annular intermediate element having a plurality of members of circular section equidistantly spaced and connector plates integrally formed with said members and interconnecting the members, said members and connector plates being bent in the shape of a ring with a gap between the end members in the plurality of members.

2. A bearing as claimed in claim 1 wherein the annular intermediate element is integrally molded of a plastic material taken from the group consisting of polyacetal resin and polyamide resin.

3. A bearing as claimed in claim 2 wherein the inner ring and the outer ring are of the same plastic material as said intermediate member.

4. A bearing as claimed in claim 1 wherein said members are cylindrical and are in line contact with said annular surfaces.

5. A bearing as claimed in claim 4 wherein said annular surfaces are right cylindrical surfaces.

6. A bearing as claimed in claim 4 wherein said annular surfaces are conical surfaces.

7. A bearing as claimed in claim 1 wherein said members are spherical and are in point contact with said annular surfaces.

* * * * *